Jan. 25, 1938. C. F. HAMMOND, JR., ET AL Re. 20,637

WORM GEAR ADJUSTMENT FOR STEERING GEARS

Original Filed April 1, 1935 2 Sheets-Sheet 1

INVENTORS
CHARLES F. HAMMOND JR.
HARPER E. PULLEYBLANK

Wheltemore Hulbert Whettemore & Beckwith.

ATTORNEYS

Jan. 25, 1938. C. F. HAMMOND, JR., ET AL Re. 20,637

WORM GEAR ADJUSTMENT FOR STEERING GEARS

Original Filed April 1, 1935 2 Sheets-Sheet 2

INVENTORS
CHARLES F. HAMMOND JR.
HARPER E. PULLEYBLANK

BY
Wellman, Hulbert & Wellman & Bellamy.
ATTORNEYS

Reissued Jan. 25, 1938

Re. 20,637

UNITED STATES PATENT OFFICE 20,637

WORM GEAR ADJUSTMENT FOR STEERING GEARS

Charles F. Hammond, Jr., and Harper E. Pulleyblank, Detroit, Mich., assignors to Gemmer Manufacturing Company, Detroit, Mich., a corporation of Michigan Original No. 2,069,143, dated January 26, 1937, Serial No. 14,176, April 1, 1935. Application for reissue October 11, 1937, Serial No. 168,524

10 Claims. (Cl. 74—500)

The invention relates to steering gears and more particularly to the means for adjusting the worm gearing between the steering stem and rock shaft. It is the object of the invention to simplify the construction and to provide means through which lost motion between the gears can be easily taken up at any time without disassembly of the parts. To this end the invention consists in the construction as hereinafter set forth.

Figure 1:
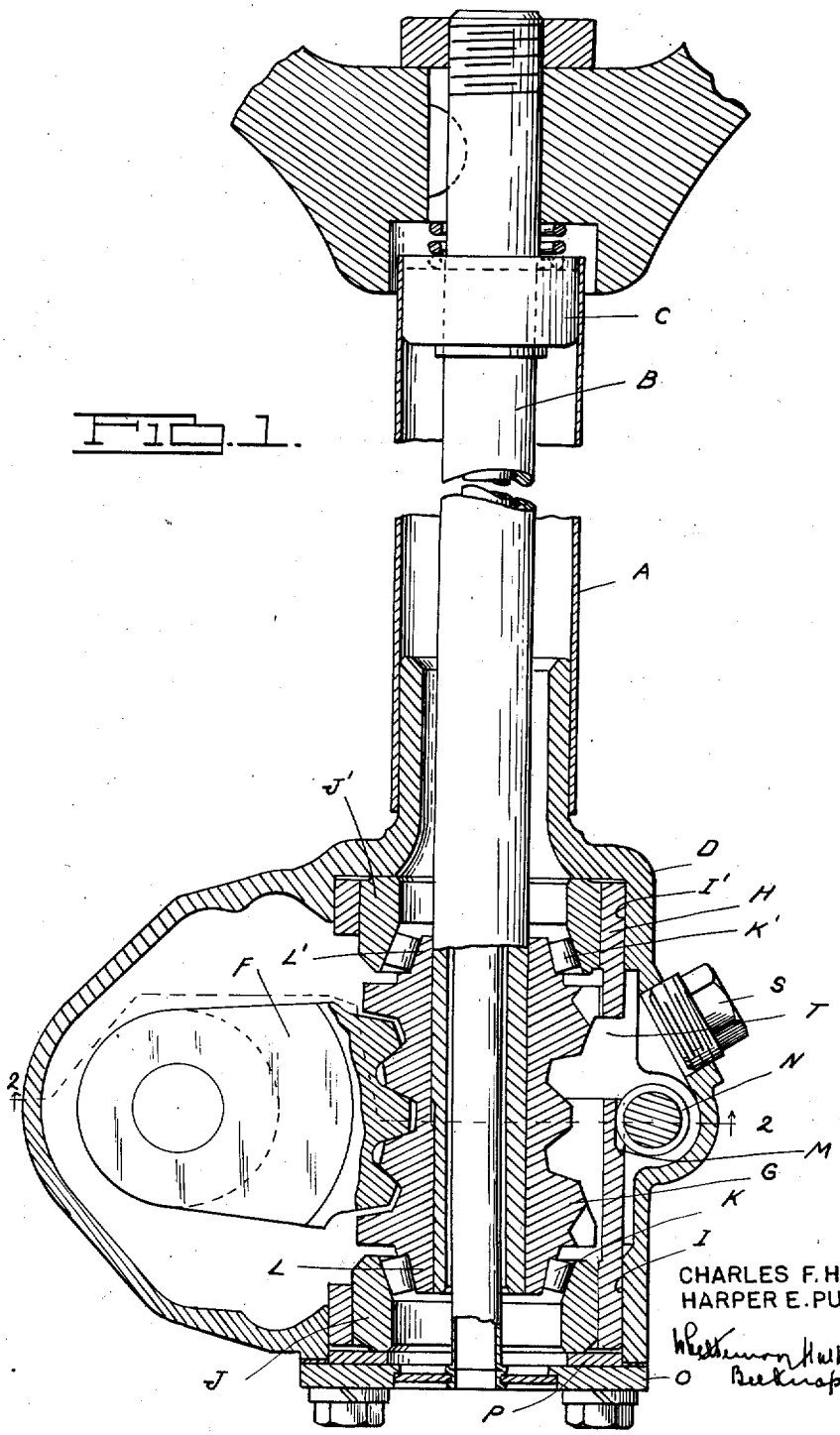
Fig. 1 is a longitudinal section through the steering post and the worm gear housing of a steering gear.
Figure 2:
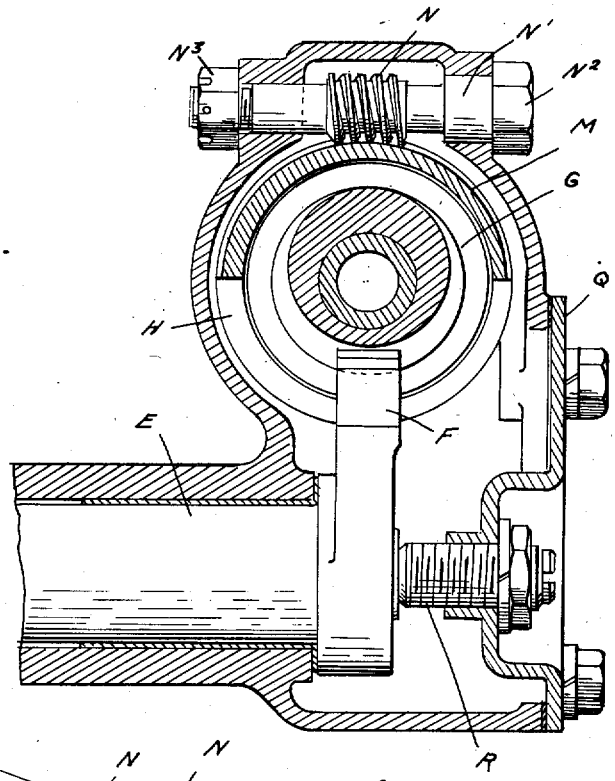
Fig. 2 is a transverse section substantially on line 2—2 of Fig. 1.
Figure 3:
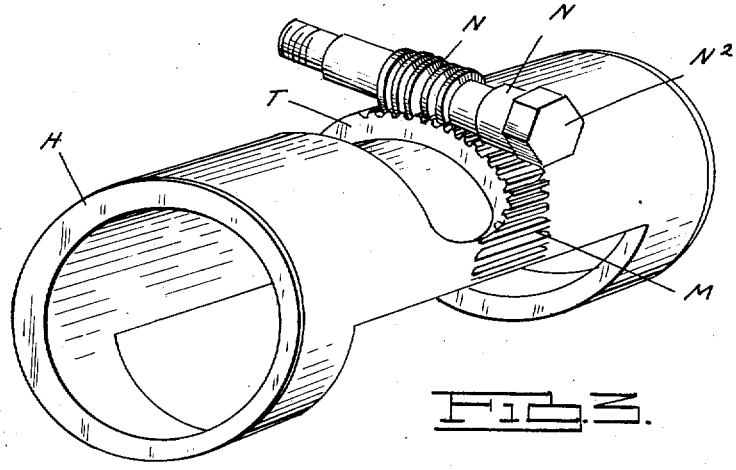
Fig. 3 is a perspective view showing the eccentric sleeve and rotary adjustment means therefor.

As illustrated, A is the steering post containing the steering stem B supported at the upper end of the post by a bearing C. D is the gear housing on which the post A is mounted. Journaled within this housing is the rock shaft E having mounted thereon the worm gear wheel F and intermeshing with this gear wheel is the worm G mounted on the stem B.

The usual adjustment between the worm and the gear is by a movement of the gear, the worm remaining in fixed position within the housing. In our improved construction the axis of the worm gear and its rock shaft remains in fixed position within the housing and adjustment is made by a relative movement of the worm and its steering stem, the construction being as follows: H is an eccentric sleeve or bushing which is insertable through an opening in the lower end of the housing D into engagement with cylindrical bearings I and I′. Within the sleeve H are the race members J and J′ for the roller bearings K, K′ which engage cones L and L′ at the opposite ends of the worm. The sleeve H is cut away on one side intermediate the portions engaging the bearings I and I′ so as to provide clearance for the worm wheel. The remaining segment has formed on the outer surface thereof a worm gear M which is in mesh with a worm N on a transversely extending shaft N′ engaging bearings in the housing D. At one end of this shaft is a polygonal head $N^2$ outside the housing D and at the opposite end a clamping nut $N^3$ engaging a threaded end portion of the shaft. Thus by rotating the head $N^2$ the worm N through its engagement with the worm gear segment M will impart a rotary adjustment to the sleeve H and after such adjustment the parts may be locked by tightening the clamping nut $N^3$.

With the construction as described, it will be understood that the axis of the steering stem B and worm G is eccentric to the axis of the external surface of the sleeve H. Consequently when this sleeve is rotated within the bearings I, I′ in the casing D, it will shift the worm laterally towards or from the worm gear F. This adjustment of the worm carries with it the stem B, but the limited amount of movement and the comparatively long distance to the bearing C at the upper end of the post will permit of flexing of the stem and will not interfere with the free rotation thereof. After introduction of the sleeve H and worm G through the opening in the bottom of the housing D, this opening is closed by a cover plate O. A shim P is placed between this cover plate and the race member J to receive the end thrust and to take up all lost motion in the roller bearings. A removable cover plate Q permits of the insertion of the rock shaft E and worm gear F into the housing and a screw R in this cover plate Q bears against the center of the gear to hold the same in position. Lubrication is introduced through a removable cap S at the side of the housing and the sleeve H is cut away at T adjacent to the gear segment M to permit passage of the lubricant into said sleeve and on to the gears.

While we have described only one specific construction, it is obvious that other specific constructions may be employed for accomplishing the same result. The essential features are, first, that the worm and its operating stem are adjusted within the housing, the worm gear and rock shaft remaining in fixed position; second, this adjustment of the worm is preferably through the rotation of an eccentric bearing; third, there are preferably a pair of eccentric bearings at opposite ends of the worm which are simultaneously and equally adjusted to move said worm in relation to the worm gear.

The eccentric sleeve H while circumferentially surrounding the race members J and J′ does not form the end thrust bearings for said race member. Thus the race member J′ has an end thrust bearing against the housing D and the race member J contacts with the shim P. Thus the sleeve does not in any way interfere with the adjustment of these race members in taking up all lost motion between the same and the rollers K. Another advantage of this is that when the eccentric sleeve H is rotated for the purpose of adjusting the worm with respect to the worm gear, this rotation is not necessarily imparted to the race members J and J'. Consequently there is less frictional resistance to this adjustment than would be the case if the race members were revolved with the sleeve, for the end pressure on said race members is sufficient to develop a considerable friction between the same and their end bearings respectively on the casing D and shim P.

What we claim as our invention is:

1. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for said worm at opposite ends thereof, eccentric mountings for said journal bearings and means for simultaneously rotating said eccentric mountings independently of any rotation of said bearings to adjust said worm towards or from said worm gear.

2. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, a radial and end thrust journal bearing for said worm, an eccentric sleeve surrounding portions of said worm and said journal bearing within said housing, and means operable from outside said housing for rotating said eccentric sleeve independently of any rotation of said bearings to adjust said worm towards or from said worm gear.

3. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for the opposite ends of said worm, an eccentric sleeve surrounding portions of said worm and said journal bearings and journaled within said housing, and means operable from outside said housing for rotating said eccentric sleeve independently of any rotation of said bearings to move said worm towards or from said worm gear.

4. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings and having a gear segment on its outer face, a helical gear engaging said gear segment, a shaft on which said helical gear is mounted extending transversely of said housing and outward through the wall thereof, and a polygonal head at the outer end of said shaft for rotating the same to adjust said worm towards or from said gear.

5. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings, and having a gear segment on its outer face, a helical gear engaging said gear segment, a shaft on which said helical gear is mounted extending transversely of said housing with its opposite ends passing through the walls thereof, a polygonal head at one end of said shaft for rotating the same independently of any rotation of said bearings to adjust said worm towards or from said worm gear and a nut engaging a threaded portion on the opposite end of said shaft to clamp the same in any position of adjustment.

6. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gear, radial and end thrust journal bearings for opposite ends of said worm, an eccentric sleeve surrounding portions of said worm and said journal bearings and having a gear segment on its outer face, a gear in mesh with said gear segment and a shaft on which said gear is mounted extending out of said housing and constituting an external means for rotating said eccentric sleeve independently of any rotation of said bearings.

7. In a steering gear, the combination of a gear housing, a steering post mounted thereon, a steering stem within said post, a bearing for said stem at the upper end of said post, a rock shaft extending transversely of said housing and having its axis in fixed relation thereto, a worm gear on said rock shaft, a worm on said steering stem intermeshing with said worm gearing, radial and end thrust journal bearings for said worm at opposite ends thereof, eccentric mountings for said journal bearings, means for axially adjusting one of said journal bearings to take up all axial lost motion of the worm, and means for simultaneously rotating said eccentric mountings independently of any rotation of said bearings to adjust the latter and said worm towards or from said gear.

8. In a steering gear, the combination of a gear housing, a rock shaft having a worm wheel segment thereon mounted about a fixed axis in said housing, a steering stem, a worm thereon engaging said worm segment, abutments in said housing in planes perpendicular to the axis of said worm for receiving the end thrust thereof, an eccentric sleeve rotatable in said housing and surrounding a portion of said worm to receive the radial thrust independent of the end thrust thereof, and means for rotating said sleeve to adjust said worm laterally of said abutments toward or from said worm wheel segment.

9. In a steering gear, the combination of a gear housing, a rock shaft having a worm wheel segment thereon mounted about a fixed axis in said housing, a steering stem, a worm thereon engaging said worm segment, radial and end thrust journal bearings for said worm, abutments in said housing in planes perpendicular to the axis of said worm for receiving the end thrust of said bearings, an eccentric sleeve rotatable in said housing surrounding said bearings to receive the radial thrust independent of the end thrust thereof, and means for rotating said sleeve to adjust said bearings laterally of said abutments and to thereby move said worm toward or from said worm wheel segment.

10. In a steering gear, the combination of a gear housing, a rock shaft having a worm wheel segment thereon mounted about a fixed axis in said housing, a steering stem, a worm thereon engaging said worm segment, radial and end thrust roller bearings for said worm provided with outer race members, abutments within said housing in planes perpendicular to the axis of said worm for directly contacting with and receiving the end thrust of said race members, an eccentric sleeve rotatable within said housing surrounding said race members and receiving the radial thrust independent of the end thrust thereof, and means for rotating said sleeve independent of any rotation of said race members to adjust the latter laterally of said abutments and to thereby move said worm toward or from said worm wheel segment.

CHARLES F. HAMMOND, JR.
HARPER E. PULLEYBLANK.